US006540194B2

(12) United States Patent
Schmitt

(10) Patent No.: US 6,540,194 B2
(45) Date of Patent: Apr. 1, 2003

(54) DEVICE FOR VERTICALLY CLAMPING ROD-LIKE OBJECT

(76) Inventor: Rolf-Peter Schmitt, Industriegebiet Feincheswiese, D-56424 Staudt (DE)

(*) Notice: Subject to any disclaimer, the term of this patent is extended or adjusted under 35 U.S.C. 154(b) by 0 days.

(21) Appl. No.: 09/837,238

(22) Filed: Apr. 18, 2001

(65) Prior Publication Data

US 2001/0032917 A1 Oct. 25, 2001

(30) Foreign Application Priority Data

Apr. 22, 2000 (DE) .................................... 200 07 432 U

(51) Int. Cl.[7] ................................................ F16M 13/00

(52) U.S. Cl. ........................ 248/511; 248/519; 248/523

(58) Field of Search ................................ 248/511, 519, 248/523, 524; 47/42, 40.5

(56) References Cited

U.S. PATENT DOCUMENTS

| | | | | | |
|---|---|---|---|---|---|
| 3,136,514 | A | * | 6/1964 | Rzepela | 47/40.5 |
| 4,712,328 | A | * | 12/1987 | Gies | 47/40.5 |
| 5,160,110 | A | * | 11/1992 | Praegitzer | 248/523 |
| 5,467,959 | A | * | 11/1995 | Behringer | 248/523 |
| 5,918,849 | A | * | 7/1999 | Bliss | 248/523 |
| 5,938,168 | A | * | 8/1999 | Adams | 248/523 |
| 6,257,557 | B1 | * | 7/2001 | Anderson et al. | 256/1 |

* cited by examiner

*Primary Examiner*—Ramon O. Ramirez
*Assistant Examiner*—Amy J. Sterling
(74) *Attorney, Agent, or Firm*—Friedrich Kueffner

(57) ABSTRACT

A device for vertically clamping rod-like objects, such as stems, bars or poles, includes a support member with a receiving opening arranged in a housing and at least three clamping levers each mounted in the support body on a vertical axle so as to be pivotable laterally into the receiving opening. Each clamping lever is provided in a middle portion thereof with a clamping prism and the bottom of the housing has in the center thereof a guide element.

9 Claims, 1 Drawing Sheet

DEVICE FOR VERTICALLY CLAMPING ROD-LIKE OBJECT

BACKGROUND OF THE INVENTION

1. Field of the Invention

The invention relates to a device for vertically clamping rod-like objects, such as logs, bars and stems, wherein the device includes a support body mounted in a housing and having a receiving opening, and at least three clamping levers mounted in the support body on a vertical axle so as to be pivotable laterally into the receiving opening.

2. Description of the Related Art

A device of the above-described type is disclosed in DE-OS 196 04 543. In this device, all clamping elements are moved simultaneously and uniformly against the rod-like object which has been inserted into the receiving opening and the object is clamped as a result. However, this clamping action does not ensure that the rod-like object will not tilt. For example, if the stem of a Christmas tree is to be clamped, the housing containing the support body must be provided in the center of its bottom with a spike which can penetrate into the end face of the stem of the Christmas tree and exclude a tilting movement. However, when the stem of a Christmas tree is placed on the spike, it is extremely difficult to place the stem concentrically on the spike. Small deviations from the center already have the result that the stem of the Christmas tree assumes an inclined position. This problem could be solved, for example, by initially making a bore in the end face of the stem of the Christmas tree into which the spike can engage. However, this also does not ensure that the stem is inserted within the support body and the housing in such a way that the spike can actually penetrate into the bore. This sometimes requires several attempts and is time consuming. If the object to be clamped is not the stem of a Christmas tree, the spike on the bottom of the housing cannot be used for additionally centering the object. If the pivotable and adjustable clamping elements rest, for example, against a metal rod, it is possible to clamp the rod, however, a vertical position of the rod is only achieved extremely infrequently. Accordingly, the device known in the art is not suitable for vertically clamping metal rods, for example, flag poles and sun umbrellas.

SUMMARY OF THE INVENTION

Therefore, it is the primary object of the present invention to further develop the prior art device described above in such a way that a vertical position of the rod-like object can always be achieved without difficulties and that the device can also especially be used for vertically clamping metal rods.

In accordance with the present invention, in a device of the above-described type, each clamping lever is equipped in a middle portion thereof with a clamping prism and the bottom of the housing has in the center thereof a guide element.

Particularly in the case of metal rods, the clamping prisms ensure that the clamping elements rest securely against the rods. The guide element ensures that independently of the diameter of the rod-like object, the object always assumes a vertical position in the support body or the housing.

The various features of novelty which characterize the invention are pointed out with particularity in the claims annexed to and forming a part of the disclosure. For a better understanding of the invention, its operating advantages, specific objects attained by its use, reference should be had to the descriptive matter in which there are described preferred embodiments of the invention.

BRIEF DESCRIPTION OF TEE DRAWING

DESCRIPTION OF THE PREFERRED EMBODIMENTS

Figure 1:
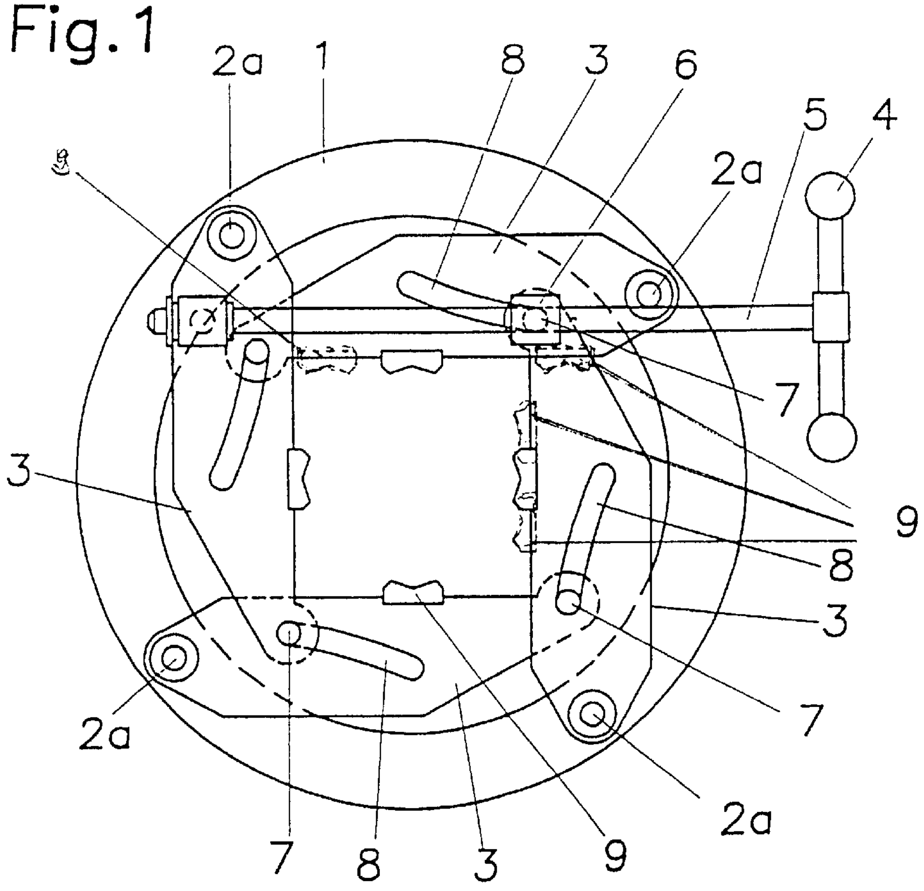
FIG. 1 is a top view of a device according to the present invention.

FIG. 1 of the drawing shows a device according to the present invention which serves to vertically clamp and secure a rod-like object, for example, the stem of a Christmas tree, a flag pole, a sun umbrella or a sign.

Figure 2:
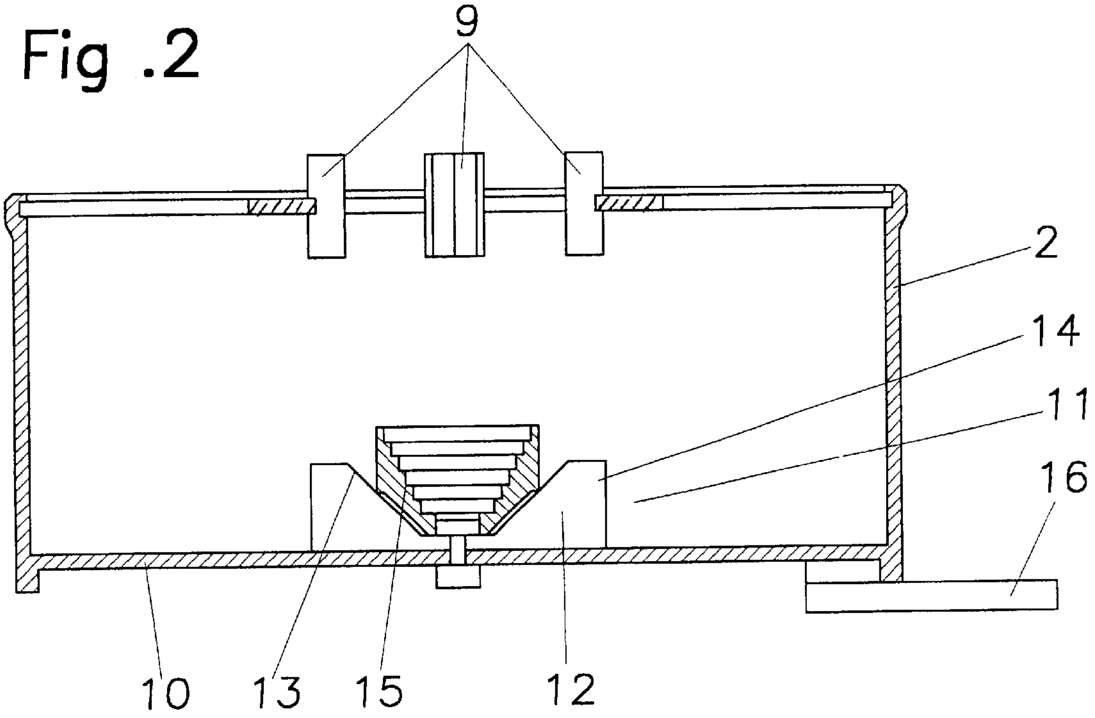
FIG. 2 is a schematic sectional view of the device of FIG. 1.

The device is composed of a ring-shaped support body 1, preferably of metal. In the illustrated embodiment, the support body 1 is placed in a housing 2 as seen in FIG. 2. The ring-shaped support body 1 has in the illustrated embodiment four axles **2*a* which are offset relative to each other by 90° and which each receive a pivotable clamping lever 3. Using a crank 5 with a spindle 5 and a nut 6, all clamping levers 3 can be pivoted horizontally about their axles 2*a* in a counterclockwise direction and back. Clamping pins 7 and grooves 8** are additionally provided for this purpose.

The clamping levers 3 are all equipped with a clamping prism 9, wherein the clamping prisms 9 can be fixedly mounted on the clamping levers 3. However, it is advantageous to mount the clamping prisms 9 so as to be slidable on the clamping levers 3. Different positions of the clamping prisms 9 are shown in broken lines. This makes it possible that when the clamping levers 3 are pivoted, the clamping prisms 9 can always assume a precise tangential position relative to the rod-like object to be clamped. The clamping prisms 9 each have at their side facing away from the clamping lever 3 a prismatic clamping surface.

As shown in FIG. 2, a guide element 11 is mounted at the bottom 10 of the housing 2. In the illustrated embodiment, the guide element 11 is formed by three centering webs 12 which are offset relative to each other by an angle of 120°. The centering webs 12 each have a surface 13 which extends conically relative to the axis of the housing 2. The surfaces 13 of all centering webs 12 ensure that the end face of the rod-like object to be clamped is centered in the area of the bottom 10 of the housing 2.

In the illustrated embodiment, mounted within the centering webs 12 is a sleeve 14 which is on the inside thereof provided with annular steps 15. The diameters of these steps 15 can be adapted to different diameters of the rod-shaped object. Consequently, the sleeve 14 also acts as a guide element 11 for the rod-like object to be received. The centering webs 12 as well as the sleeve 14 can be used separately, however, it is advantageous to use these elements in the combination illustrated in FIG. 2.

It is possible to provide radially outwardly projecting legs 16 at the bottom of the housing 2. These legs 16 are either slidably or pivotably attached to the bottom 10 of the housing 2. It is also possible to screw the legs 16 to the bottom 10 of the housing 2 when required. This increases the support surface area of the device. If necessary, holes can be provided in the legs 16 through which pegs or pins can be driven. This makes it possible to secure the device in a stable manner on the ground.

While specific embodiments of the invention have been shown and described in detail to illustrate the inventive principles, it will be understood that the invention may be embodied otherwise without departing from such principles.

I claim:

1. A device for vertically clamping rod-shaped objects, the device comprising a support member with a receiving opening mounted in a housing, and at least three clamping levers each mounted on a vertical axle so as to be pivotable laterally into the receiving opening, wherein each clamping lever has in a middle portion along the length thereof a clamping prism, wherein the housing has a bottom with a center, and wherein a guide element is mounted in the center of the bottom of the housing.

2. The device according to claim 1, wherein the clamping prisms are fixedly mounted on the clamping levers.

3. The device according to claim 1, wherein the clamping prisms are slidably mounted on the clamping levers.

4. The device according to claim 1, wherein the guide element comprises at least three centering webs having surfaces extending conically relative to an axis of the housing.

5. The device according to claim 1, wherein the guide element comprises a sleeve having at least two inner annular steps.

6. The device according to claim 1, wherein the guide element is fastened to the bottom of the housing by a screw.

7. The device according to claim 1, wherein the guide element comprises at least three centering webs having surfaces extending conically relative to an axis of the housing, and wherein the guide element comprises a sleeve with at least two inner annular steps, and wherein the sleeve is mounted between the centering webs.

8. The device according to claim 1, further comprising legs at the bottom of the housing.

9. The device according to claim 8, wherein the legs are mounted so as to be movable outwardly.

* * * * *